No. 815,264. PATENTED MAR. 13, 1906.
J. E. CHAMBERS.
SUTURE BRIDGE.
APPLICATION FILED FEB. 27, 1905.
2 SHEETS—SHEET 1.
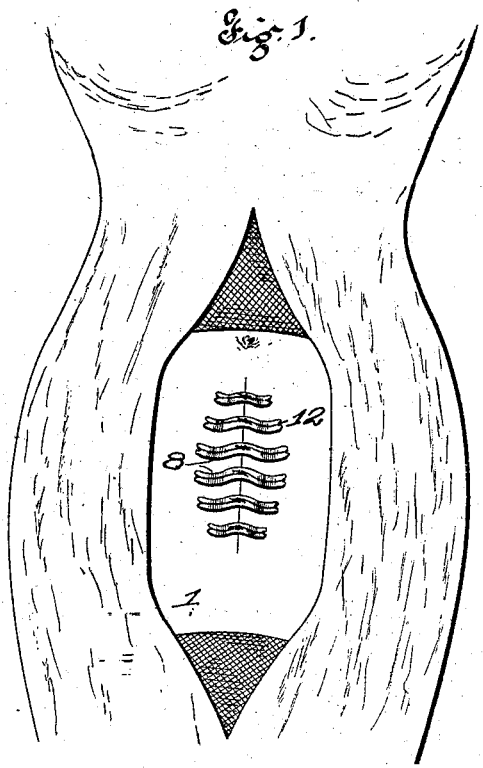
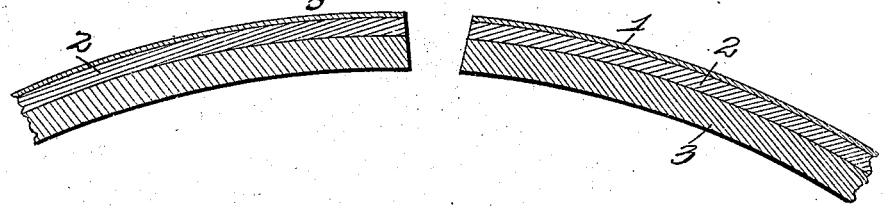
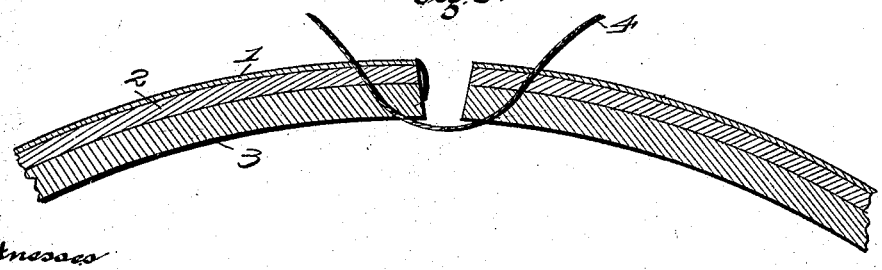
Witnesses
Alfred A. Eicks
Edw. M. Harrington.
Inventor
Joseph E. Chambers
By Higdon, Longan & Hopkins Attys.

No. 815,264. PATENTED MAR. 13, 1906.
J. E. CHAMBERS.
SUTURE BRIDGE.
APPLICATION FILED FEB. 27, 1905.
2 SHEETS—SHEET 2.
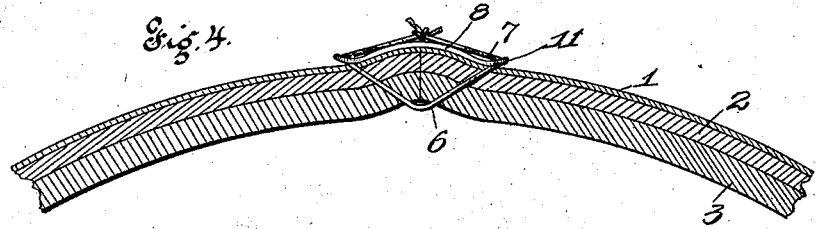
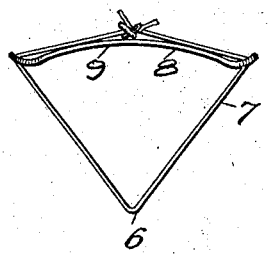
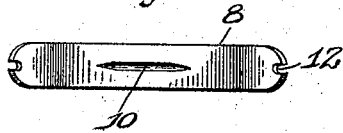 
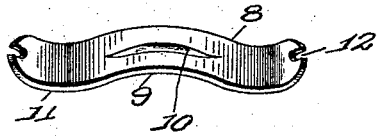
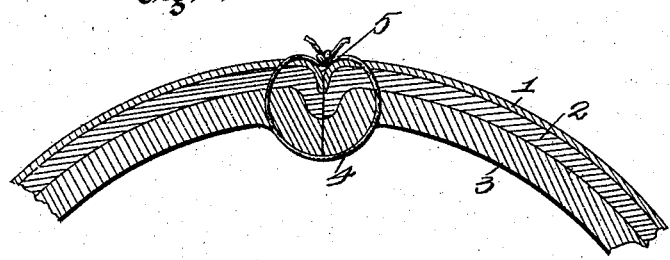

UNITED STATES PATENT OFFICE.

JOSEPH E. CHAMBERS, OF ST. LOUIS, MISSOURI.

SUTURE-BRIDGE.

No. 815,264.  Specification of Letters Patent.  Patented March 13, 1906.

Application filed February 27, 1905. Serial No. 247,628.

*To all whom it may concern:*

Be it known that I, JOSEPH E. CHAMBERS, a citizen of the United States, and a resident of the city of St. Louis, Missouri, have invented certain new and useful Improvements in Suture-Bridges, of which the following is a specification containing a full, clear, and exact description, reference being had to the accompanying drawings, forming a part hereof.

My invention relates to improvements in suture-bridges; and it consists of the novel features herein shown, described, and claimed.

In the drawings, Figure 1 shows my invention applied to an abdominal wound. Fig. 2 illustrates a cross-section of an abdominal wound about to be closed. Fig. 3 illustrates the deep suture as it is usually placed ready to close the wound. Fig. 4 illustrates the wound closed by my improved suture. Fig. 5 illustrates how my improved invention holds the suture in a triangular shape. Fig. 6 is a top plan view of my invention. Fig. 7 is a longitudinal mid-section. Fig. 8 is a perspective view of my invention. Fig. 9 is a cross-sectional view of the old form of closing an abdominal wound.

The object of my invention is to prevent the torture of cutting threads, stitches, abscesses, cross-scars, and auto-infection.

Referring to the drawings, 1 indicates the skin layer, 2 the fatty substances, and 3 the muscular layer. In the operation of closing the wound the suture or stitch thread 4 is passed through these three layers, as illustrated in Fig. 3, and according to the old form of suture the wound is closed as illustrated in Fig. 9 and the skin is so drawn together that a trough 5 is formed. According to the old form into this trough the perspiration and skin excrement flow, and it cannot flow out, for the patient must lie on the back until the wound is healed. This trough becomes a breeding-ground of infection. The stitches cutting their way through the skin from the sides add their discharge to the filth of excrement, thus increasing the discomfort and danger. The salty perspiration, mixed with the filth held in this trough by force of gravity, pours into the channels cut by the threads, saturates them, and produces the annoying characteristic stitch pain. This old form of suture, which causes an inversion in the trough on the exterior surface, forms a knuckle or ridge on the inner surface of the abdominal wall, which adds increased pressure and danger to the wounds in the cavity. By referring to Fig. 4, wherein I employ my invention, it will be seen that when the wound is closed by the use of my suture-bridge the skin layer 1 is brought into apposition without inversion and lifted above the normal surface, forming a ridge, which causes the perspiration and skin secretions to flow away from the wound and lifts the muscular abdominal walls away from the wounded sensitive viscera and converts an otherwise circular (as in the old form of suture) into a triangular stitch, as illustrated in Fig. 5. It will be further noted by referring to Fig. 4 that the apex 6 of the triangular suture 7 lifts the abdominal muscles off the wounded peritoneum and exerts a greater force on the muscular section of the wall than elsewhere, and thereby removing danger of hernias.

The suture-bridge 8 consists of a central arch portion 9, with a depression 10 formed in said arch portion, rounded terminal portion 11, and notches 12 formed in said rounded portions, and by referring to Fig. 4 it will be seen in applying my suture-bridge to the wound that the arch portion 9 is placed over the incision, and the suture or stitch thread 7 is located in the notches 12 and the depression 10 when the suture is tied, and when the suture has closed the wound and the suture-bridge applied and the suture tied the suture-bridge and stitch lift the skin surface into the arch portion of the bridge, thereby forming a ridge which causes the perspiration and excrement to flow away from the wound. The thread resting in the notches 12 prevents the thread from cutting into the skin, and the bridge being located between the skin and the thread prevents cross-scars.

By the use of my invention the wound margins are united evenly and firmly without inversion anywhere.

The object of the depression 10 and notches 12 is to prevent the surface or stitch thread from being dislocated from the bridge.

It will be seen by the foregoing that by use of my improved suture-bridge the stitch or suture is held in triangular form as distinguished from the old circular form of suture illustrated in Fig. 9.

Having fully described my invention, what I claim is—

1. A suture-bridge, constructed of a single piece of material having a central arched portion, and being provided with upturned ends, and there being a longitudinally-extending groove formed in the top surface of the arched portion; substantially as specified.

2. A suture-bridge, constructed of a single piece of material having an arched central portion and its ends being upturned and provided with thread-receiving notches, and there being a longitudinally-extending groove formed in the top surface of the arched portion; substantially as specified.

In testimony whereof I have signed my name to this specification in presence of two subscribing witnesses.

JOSEPH E. CHAMBERS.

Witnesses:
EDWARD E. LONGAN,
ALFRED A. EICKS.